M. SHETLER.
PISTON RING.
APPLICATION FILED DEC. 11, 1918.

1,365,348.

Patented Jan. 11, 1921.

Inventor
MELVIN SHETLER

Witness
Gordon Reish.

By Charles E. Wiemer
Attorney

UNITED STATES PATENT OFFICE.

MELVIN SHETLER, OF FLINT, MICHIGAN.

PISTON-RING.

1,365,348.  Specification of Letters Patent.  Patented Jan. 11, 1921.

Application filed December 11, 1918. Serial No. 266,192.

*To all whom it may concern:*

Be it known that I, MELVIN SHETLER, a citizen of the United States, residing at Flint, county of Genesee, State of Michigan, have invented a certain new and useful Improvement in Piston-Rings, and declare the following to be a full, clear, and exact description of the same, such as will enable others skilled in the art to which it pertains to make and use the same, reference being had to the accompanying drawings, which form a part of this specification.

This invention relates to piston rings, and its object is to provide a ring of a construction to prevent accumulation of gas under pressure between the ring and the bottom of the groove provided therefor in the piston. In rings of the usual type, gas under pressure produced by explosion in the combustion chamber of the cylinder is forced into the ring groove back of the ring and expands the ring forcibly in contact with the cylinder wall increasing the friction to an inordinate extent and increasing the tendency of the ring to seize in the cylinder when overheated.

The piston ring is usually placed on the piston and compressed for introduction in the cylinder and the natural tendency of the ring to expand provides a contact with the cylinder wall under sufficient pressure for efficient operation of the piston and any material increase in the pressure on the cylinder wall is detrimental. It is the object of this invention to prevent such increase in pressure and a further feature of the invention is to provide a piston ring of uniform width and thickness and having greater flexibility upon one side than upon the other to equalize the tension. These objects and the various novel features of the invention are hereinafter more fully described and claimed and shown in the accompanying drawings in which—

Figure 2:
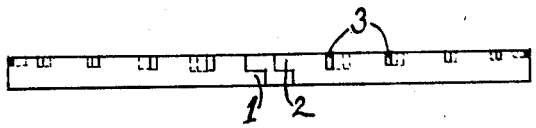
Fig. 2 is a side elevation thereof.

To secure flexibility of split rings it has been the practice heretofore to make the inner wall of the ring eccentric to the outer wall whereby the ring has greater flexibility upon one side than upon the other. In the present invention the ring is of the same width and thickness throughout being split upon one side and provided with the overlapping ends 1 and 2 as indicated in Fig. 2. It is to be understood, however, that the ends may be of various shapes. On one side the ring is provided with a series of slots 3 cut entirely across the edge of the ring preferably at an angle to a radial line as indicated, and these slots are more numerous and of greater depth on the split side of the ring than upon the side opposite, the slots gradually increasing in distance apart from each end of the ring toward the opposite side and uniformly decreasing in depth. The back of the ring at about the point 4 is therefore less flexible than at the ends, and this construction provides the necessary tendency of the ring to uniformly expand when compressed within the cylinder and, being of uniform thickness, the ring groove in the piston is filled to the maximum extent throughout.

With all piston rings gas tends to be forced into the ring groove back of the ring by the force of the explosion and with the eccentric type of ring above mentioned, which is thin upon the one side, there is much greater tendency to gas pack than with the ring of uniform thickness as is here shown, and the purpose of making a ring of uniform thickness as described, is to reduce the tendency to gas pack to a minimum.

The notches 3 have two functions—first— by the arrangement as above described, a ring of greater flexibility on one side than the other is secured producing a uniform tension and second—by cutting the notches entirely across the edge of the ring, the ring groove back of the ring is open to the cylinder wall through these notches and any gas tending to accumulate back of the ring may pass into the cylinder. Thus the space between the ring and the bottom of the groove in which it rides is free from excess pressure and the ring is made to contact the cylinder solely by its natural tendency to expand due to the construction thereof.

Figure 1:
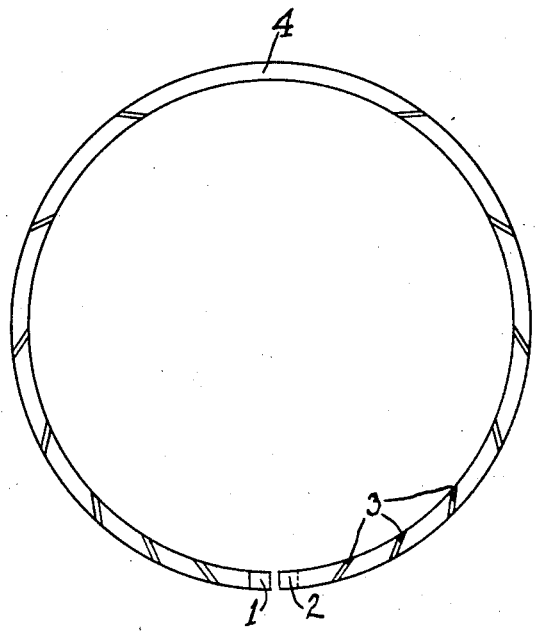
Figure 1 is a plan view of a piston ring embodying my invention.
Figure 4:
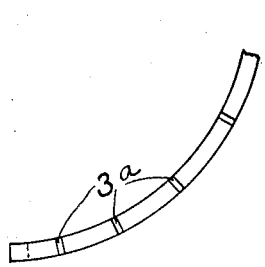
Fig. 4 is a detail showing another manner of securing flexibility.
Figure 3:
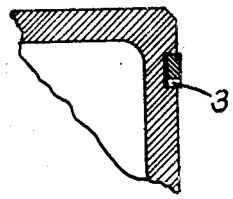
Fig. 3 is a vertical section of part of a piston showing the ring and groove therefor.

Pressure is also produced back of the ring of ordinary construction by reason of oil tending to accumulate back of the ring and to carbonize and cake therein which, coupled with the fact of gas also tending to accumulate therein and produce pressure, tends to create a contact of the ring and cylinder wall continually under an excess pressure. With the construction herein set forth, oil may not accumulate back of the ring to cause the detrimental effect stated as any tendency of oil to accumulate therein is obviated by opening space between the ring and bottom of the groove directly to the cylinder wall. Under the pressure exerted by the explosion force of the gas, the tendency thereof to pass into the ring groove and out through the notches prevents an accumulation of oil. Many engines of the internal combustion type have a tendency to pump oil into the explosion chamber resulting in detrimental carbon deposits, and the fouling of the spark plugs. By the construction herein set forth the tendency to pump oil is practically eliminated. The preferred method of forming the channels 3 is shown in Fig. 1 in which the said notches are formed diagonally across the ring from one side to the other at an angle to an axial line of the ring. By this arrangement flexibility is secured and with small liability of breakage. Nevertheless an efficient ring may be formed as shown in Fig. 4 in which the notches 3ª are formed transversely of the ring on an axial line. The same flexibility is secured by this method although there is a slightly greater liability of breakage.

The volume of gas tending to accumulate back of the piston ring in any case is small and the detrimental effect in operation is due not to volume of gas but to the pressure exerted on the ring, and to allow escape of this small volume of gas to the cylinder wall and thence into the crank case causes no detrimental effect.

While I have here shown only one ring, it is evident to anyone skilled in the art that the ring may be used in sets or singly as is usual with a ring of ordinary construction.

Having thus briefly described my invention, what I claim is—

1. A piston ring consisting of a split spring-metal ring of uniform thickness provided with glooves cut across one edge thereof at an angle to a radial line of the ring and gradually increasing in depth from the split side.

2. A piston ring consisting of a split spring-metal ring having notches cut across one edge thereof from the inner to the outer side of at an angle to a radial line of the ring passing through the notch.

3. A piston ring consisting of a split spring-metal ring of uniform thickness and having notches cut in one edge thereof from one side to the other, the notches being formed close together on the split side of the ring and gradually increasing in distance apart toward the opposite side of the ring.

4. A piston ring consisting of a split spring-metal ring of uniform thickness provided with grooves formed in one edge thereof and extending from one side to the other, the grooves being comparatively close together on the split side of the ring and uniformly increasing in width of spacing toward the opposite side of the ring, the grooves further being graduated in depth and of greatest depth adjacent the ends of the ring.

5. The combination with a cylinder, of a piston provided with a circumferential groove, a split spring-metal ring positioned therein having notches extending across the lower edge of the ring from the inner to the outer face opening the space between the ring and bottom of the groove to the wall of the cylinder, the notches increasing in width of spacing from the ends of the ring toward the opposite side.

6. The combination with a piston and cylinder of an internal combustion engine, the piston being provided with a series of circumferential grooves on the exterior surface, of a split spring-metal ring for each of the grooves, the ring being of substantially uniform thickness and having a series of notches formed in the lower edge thereof at an angle to a radial line of the ring, the notches being spaced apart a gradually increasing distance from each end of the ring toward the opposite side and gradually decreasing in depth as the distance apart increases.

7. The combination with a piston and cylinder of an internal combustion engine, the piston being provided with a circumferential groove on the exterior, of a split spring-metal ring of substantially uniform thickness provided with a series of notches cut in one edge thereof and extending from the inner to the outer side of the ring, the notches being spaced apart a gradually increasing distance from each end of the ring toward the opposite side and being of greatest depth adjacent the ends of the ring and decreasing in depth as the distance apart increases.

In testimony whereof I sign this specification.

MELVIN SHETLER.